United States Patent [19]
Hancock

[11] Patent Number: 5,275,066
[45] Date of Patent: Jan. 4, 1994

[54] MOTORED ADJUSTABLE STEERING COLUMN

[75] Inventor: Michael T. Hancock, Coventry, England

[73] Assignee: The Torrington Company, Torrington, Conn.

[21] Appl. No.: 965,464

[22] Filed: Oct. 23, 1992

[30] Foreign Application Priority Data

Nov. 7, 1991 [GB] United Kingdom ............... 9123656

[51] Int. Cl.⁵ .................................. B62D 1/18
[52] U.S. Cl. ....................... 74/493; 180/78; 280/775
[58] Field of Search ............ 74/492, 493; 180/78; 280/775

[56] References Cited

U.S. PATENT DOCUMENTS

| | | | |
|---|---|---|---|
| 4,736,673 | 4/1988 | Ishikawa | 74/493 |
| 4,752,085 | 6/1988 | Yamamoto | 74/493 X |
| 4,796,481 | 1/1989 | Nolte | 74/493 |
| 4,934,737 | 6/1990 | Nakatsuka | 280/775 |
| 5,035,446 | 7/1991 | Arvidsson | 74/493 X |

FOREIGN PATENT DOCUMENTS

| | | |
|---|---|---|
| 62-88662 | 4/1987 | Japan . |
| 62-101580 | 5/1987 | Japan . |
| WO88/10205 | 12/1988 | PCT Int'l Appl. . |
| 1005939 | 9/1965 | United Kingdom . |

Primary Examiner—Rodney H. Bonck
Assistant Examiner—David W. Laub
Attorney, Agent, or Firm—Michael H. Minns

[57] ABSTRACT

A steering column assembly for a vehicle incorporating a powered facility to adjust it in a vertical plane. A prime mover is pivotally connected to part of the steering column, the prime mover reciprocating an arm pivotably linked to one end of a bell crank lever, the other end being pivotably linked to the steering column part and an intermediate portion of the lever being able to pivot about a fixed part of the vehicle.

9 Claims, 1 Drawing Sheet

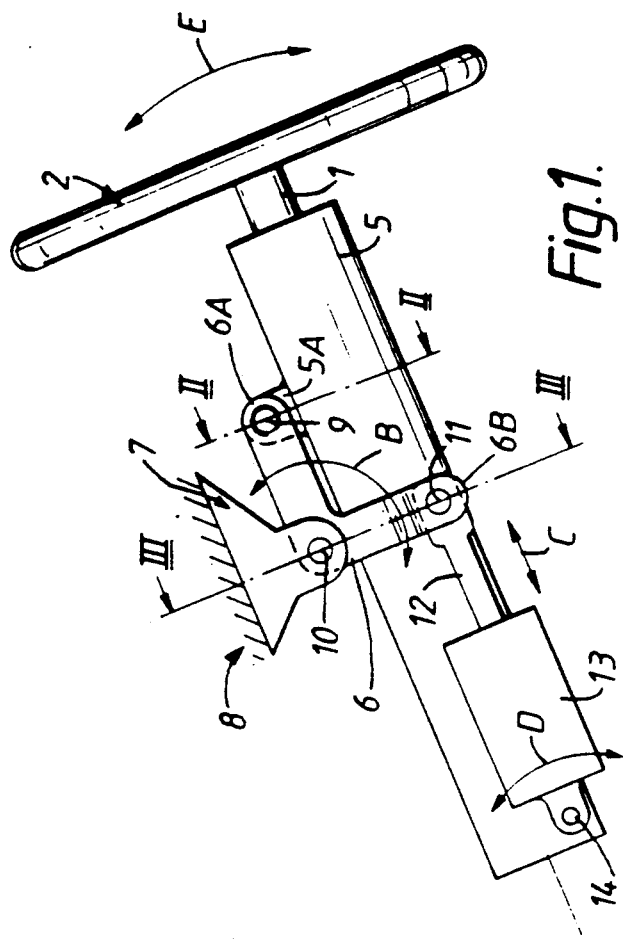
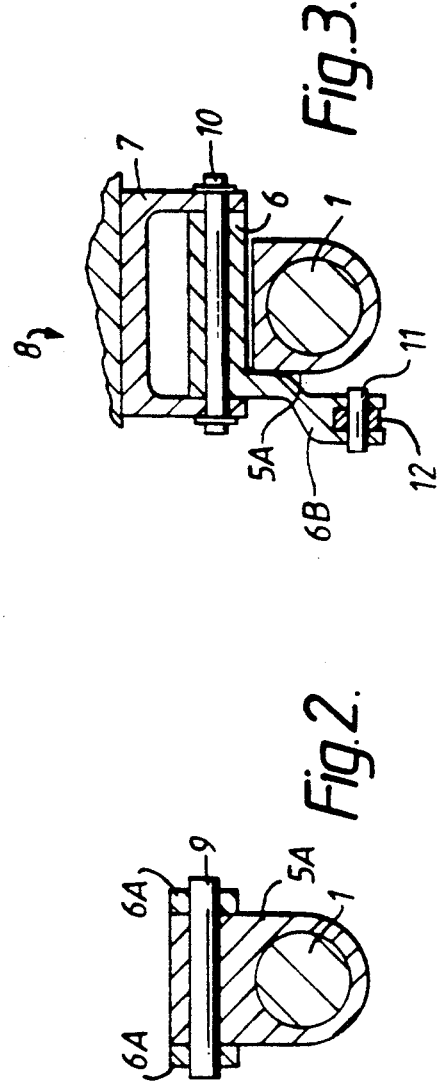
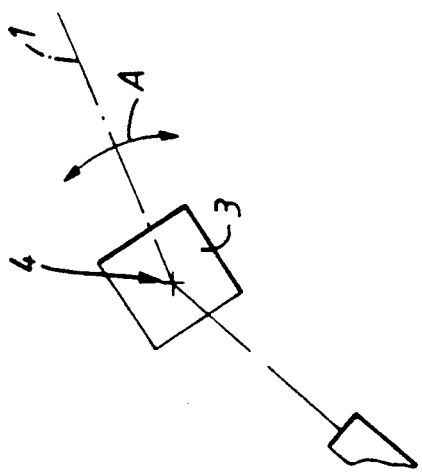

MOTORED ADJUSTABLE STEERING COLUMN

This invention relates generally to adjustable steering column assemblies and more particularly to motor operated adjustable steering column assemblies.

Known adjustable steering column arrangements include manually operable devices and are configured such that the actual adjustment to the steering column position is effected totally through the force applied to the steering wheel by the driver of the vehicle. The adjustment is through a completely manual operations. For example, the driver first releases a latch with the aid of a knob or lever. While holding the latch release, the driver than moves the steering wheel to the desired position.

With this type of manual adjustment, it is difficult to finely adjust the position of the steering wheel. This combined with the fact that the release lever most be held during the adjustment makes it difficult to reach the ideal position quickly.

Other known motor driven adjustable steering column assemblies use worm gear and wheel arrangements or sliding slipper designs. Both of which can have excessive flexure and backlash.

The foregoing illustrates limitations known to exist in present adjustable steering column assemblies. Thus, it is apparent that it would be advantageous to provide an alternative directed to overcoming one or more of the limitations set forth above.

SUMMARY OF THE INVENTION

In one aspect of the present invention, this is accomplished by providing an adjustable steering column assembly for a vehicle comprising a steering column incorporating a driver for the adjustment of the steering column assembly and a pivot linkage connecting the driver and the steering column, the pivot linkage including a bell crank lever connecting the driver with an outer steering column member.

The foregoing and other aspects will become apparent from the following detailed description of the invention when considered in conjunction with the accompanying drawing figures.

BRIEF DESCRIPTION OF THE DRAWING FIGURES

FIG. 1 is a diagrammatic side view of an adjustable steering column assembly for a vehicle comprising a steering column incorporating a prime mover for the adjustment of the steering column;

FIG. 2 is a cross-sectional view taken on the line II—II in FIG. 1; and

FIG. 3 is a cross-sectional view taken on the line III—III in FIG. 1.

DETAILED DESCRIPTION

According to the present invention, there is provided an adjustable steering column assembly for a vehicle, comprising a steering column incorporating a prime mover or driver for the adjustment of the steering column and a pivot linkage connecting the prime mover and the steering column.

Preferably, the prime mover is an electric motor. The motor can be pivotably mounted on a part of the steering column.

Preferably, the pivot linkage incorporates a bell crank lever connecting the prime mover with an outer steering column member. In a particular embodiment, the arrangement is such that the steering column is adjustable in a vertical plane through which the major axis of the column passes.

FIG. 1 shows a vehicle steering column 1 with a steering wheel 2 at a free end thereof. At the other end of the major longitudinal axial extent of the steering column 1, there is a pivotable coupling 3, which can be, for example, a constant velocity universal joint, another type of universal joint or a rubber coupling. By this means, the steering column can pivot about a pivot axis 4 in the direction indicated by the arrows A. The steering column 1 extends through an outer column 5, which itself is linked via a bell crank lever 6 to a steering column channel-shaped mounting bracket 7 which itself is mounted to a part 8 of the vehicle.

One end 6A of the bell crank lever 6 is provided with a pivot about which the outer steering column 5 can pivot via a mounting bracket 5A secured thereto. That end 6A of the bell crank lever 6 is forked as shown in FIG. 2.

The center pivot axis of the bell crank lever 6 is provided with a pivot 10 about which the mounting bracket 7 is mounted. Accordingly, the lever 6 can pivot about the pivot 10, which it does in the direction of the arrows B.

The opposite end 6B of the bell crank lever 6 is also forked and is mounted about another pivot 11. Between the forks is pivotably mounted one end of an arm 12 which can reciprocate in the direction of the arrows C. The other end of the arm 12 is coupled to an electric motor 13 which itself is mounted about a pivot 14 so that the motor can pivot in the direction of the arrows D. The pivot 14 is connected to the outer column 5. The motor 13 incorporates a lead screw mechanism or gearing to convert rotary motion to reciprocating motion for the arm 12.

It will be appreciated that operation of the motor 13 reciprocates the arm 12, thereby operating the bell crank lever 6 which in turn raises and lowers the outer steering column 5 and thus the main steering column 1 and this provides vertical adjustment of the steering wheel 2 in the direction of the arrows E.

If required, a sensor or sensors can be provided to give a programmable capability to the electric motor drive.

The lever system provided by the present invention provides a very rigid and robust action which enables the electric motor to move the steering wheel satisfactorily without unacceptable backlash, play or friction in the system. This has advantage over known use of worm and wheel arrangements and sliding slipper designs, which can give excessive flexure and backlash.

Having described the invention, what is claimed is:

1. An adjustable steering column assembly for a vehicle comprising:
    a steering column incorporating an electric motor for the adjustment of the steering column, the steering column having an inner steering column member and an outer steering column member; and
    a pivot linkage connecting the driver and the steering column, the pivot linkage including a bell crank lever connecting the driver with the outer steering column member, the electric motor being located between a point about which the steering column pivots and the pivot linkage.

2. The adjustable steering column assembly according to claim 1, wherein the electric motor is pivotally mounted to the outer steering column member.

3. The adjustable steering column assembly according to claim 1, wherein one end of the bell crank lever is pivotally coupled to the outer steering column member, an intermediate part of the bell crank lever is pivotally mounted to a part which is fixed relative to a vehicle body and the other end of the bell crank lever is pivotally linked to the electric motor.

4. The adjustable steering column assembly according to claim 3, wherein the electric motor has a reciprocating arm which pivots the bell crank lever about its intermediate pivot.

5. The adjustable steering column assembly according to claim 1, wherein the inner steering column member is rotatably relative to the outer steering column member.

6. An adjustable steering column assembly for a vehicle comprising:
 a steering column incorporating an electric motor for the adjustment of the steering column, the steering column having an inner steering column member and an outer steering column member, the electric motor being pivotally mounted to the outer steering column member; and
 a pivot linkage connecting the electric motor and the steering column, the pivot linkage including a first arm and a second arm, an end of the first arm being rigidly connected to an end of the second arm, the free end of the first arm being pivotally coupled to the outer steering column member, the portion of the pivot linkage where the first arm is rigidly connected to the second arm being pivotally mounted to an intermediate pivot which is fixed relative to a vehicle body and the free end of the second arm being pivotally linked to the electric motor.

7. The adjustable steering column assembly according to claim 6, wherein the electric motor has a reciprocating arm which pivots the pivot linkage about its intermediate pivot.

8. A pivotally adjustable steering column assembly for a vehicle comprising:
 a steering column incorporating an electric motor for the adjustment of the steering column, the steering column having an inner steering column member, an outer steering member and a steering wheel at one end thereof, the steering column pivoting about an axis, the electric motor being pivotally mounted to the outer steering column member; and
 a pivot linkage connecting the electric motor and the steering column, the pivot linkage including a first arm and a second arm, an end of the first arm being rigidly connected to an end of the second arm, the free end of the first arm being pivotally coupled to the outer steering column member, the portion of the pivot linkage where the first arm is rigidly connected to the second arm being pivotally mounted to an intermediate pivot which is fixed relative to a vehicle body and the free end of the second arm being pivotally linked to the electric motor, the electric motor being located between the steering column pivot axis and the pivot linkage.

9. The pivotally adjustable steering column assembly according to claim 8, further comprising:
 a pivotable coupling attached to the end of the steering column remote from the steering wheel, the pivotable coupling being a universal joint.

* * * * *

UNITED STATES PATENT AND TRADEMARK OFFICE
CERTIFICATE OF CORRECTION

PATENT NO. : 5,275,066
DATED : January 4, 1994
INVENTOR(S) : Michael Thomas Hancock It is certified that error appears in the above-indentified patent and that said Letters Patent is hereby corrected as shown below:

Column 2, line 17, after "a privot", insert -- 9 --.
Column 3, Claim 5, line 15, change "rotatably" to --rotatable--.

Signed and Sealed this

Nineteenth Day of July, 1994

Attest:

BRUCE LEHMAN

*Attesting Officer*     *Commissioner of Patents and Trademarks*